(No Model.)
D. B. VANCE & H. J. LAURENCE.
SIDE HILL PLOW.
No. 473,487. Patented Apr. 26, 1892.
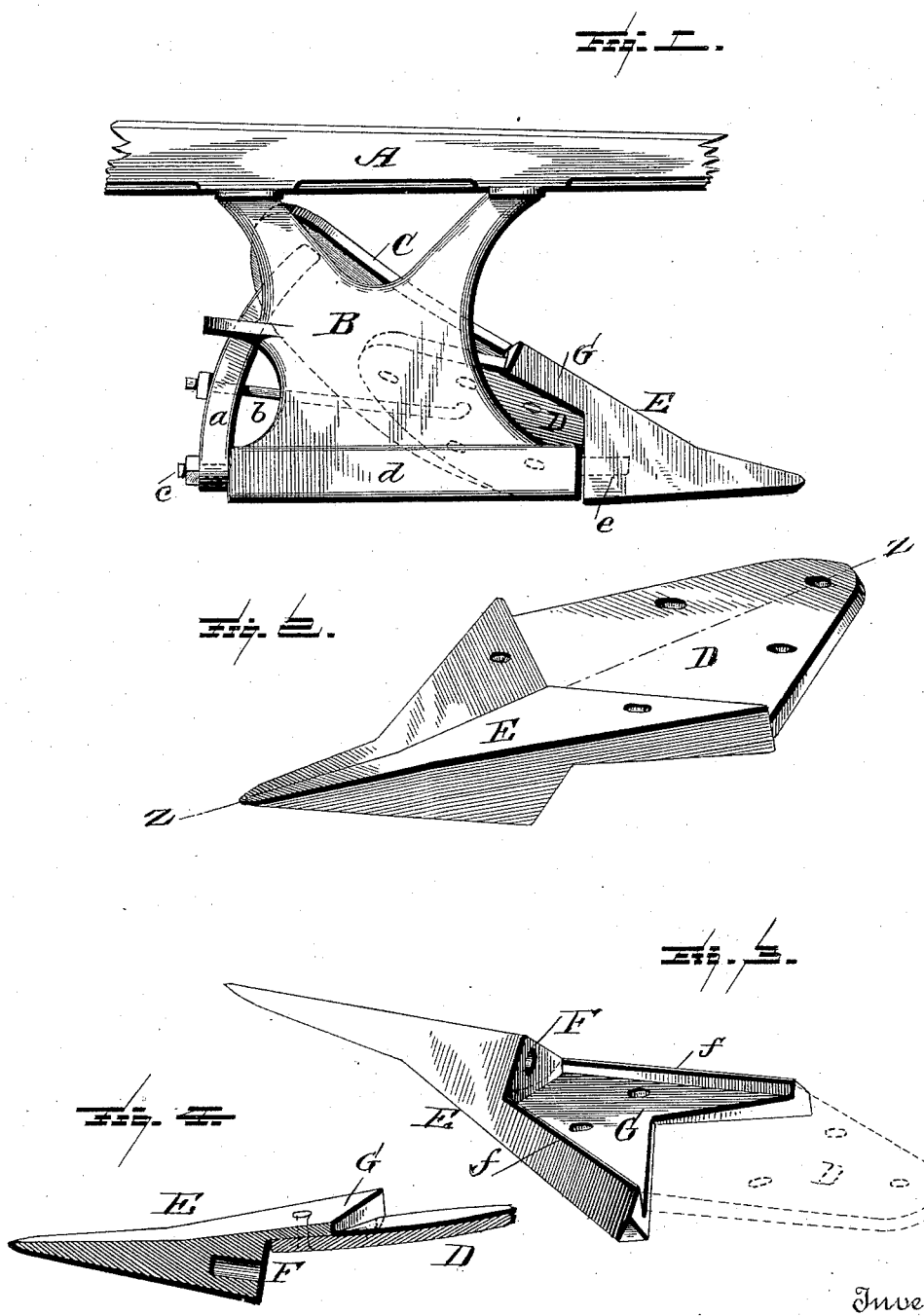
Witnesses:
L. C. Hills
E. H. Bond
Inventors
Daniel Brevard Vance
Henry Jefferson Laurence
per Chas. H. Fowler
Attorney United States Patent Office.

DANIEL BREVARD VANCE AND HENRY JEFFERSON LAURENCE, OF WOODBURY, TENNESSEE.

SIDE-HILL PLOW.

SPECIFICATION forming part of Letters Patent No. 473,487, dated April 26, 1892.

Application filed September 29, 1891. Serial No. 407,203. (No model.)

*To all whom it may concern:*

Be it known that we, DANIEL BREVARD VANCE and HENRY JEFFERSON LAURENCE, citizens of the United States, residing at Woodbury, in the county of Cannon and State of Tennessee, have invented certain new and useful Improvements in Side-Hill Plows; and we do hereby declare that the following is a full, clear, and exact description of the same, reference being had to the annexed drawings, making a part of this specification, and to the letters of reference marked thereon.

Figure 1 of the drawings represents a side elevation of a side-hill plow embodying our invention, the beam thereof being shown as partly broken away. Fig. 2 represents a perspective view of the plow point and frog, showing them connected together; Fig. 3, an under side detail perspective view of the plow-point, showing the frog in dotted lines. Fig. 4 represents a longitudinal vertical section of the plow point and frog, taken on line $z\,z$ of Fig. 2.

The present invention has relation to that class of plows in which the cutting apparatus is capable of being reversed, so as to throw its furrow-slice to the right or left, as desired, which are commonly known as "side-hill plows."

Heretofore in that class of side-hill plows where no frog was provided the shouldered socket was usually formed on the end of the wing or mold-board, which socket was designed to receive the pivot end of the ground-bar on the bottom of the standard or landside. The end of wing or mold-board, including this shouldered socket, was exposed to wear, and consequently soon became worthless, which necessitated its being replaced with a new one at considerable expense. This difficulty was to a degree overcome by the employment of what is now termed the "frog" and constructing the shouldered socket on the end thereof, the plow-point being attached to this frog and the frog in turn attached to the wing or mold-board of the plow. The shouldered socket on the frog was still subject to very considerable wear and lasted no longer than it did when on the wing or mold-board; but the frog with the shouldered socket could be replaced when worn at a much less cost than could the wing or mold-board; but still such a plow has been found expensive to keep in working order, as a new point is required with every other frog, and consequently the cost of the plow is materially increased.

It is the purpose of the invention to remove as far as possible the difficulties and objections heretofore experienced and still further improve the construction of side-hill plows, whereby the expense attending the replacing of the frog with shouldered socket when the latter becomes worn and worthless is entirely removed. To attain this object the plow-point itself is formed with this shouldered socket instead of the frog, so that with each new point a new socket will be provided, thereby obviating the buying of new wings, mold-boards, or frogs when the shouldered socket has become uselessly worn, as will be more fully described hereinafter, and subsequently pointed out in the claims.

In the accompanying drawings, A represents the beam, and B the standard or landside to which it is connected, and C represents the wing or mold-board, to which is suitably connected the frog D, and to this frog is secured the point E. To the wing or mold-board C is connected one end of a suitable brace $a$, and to the brace and frog is connected the ends of a rod $b$, said brace $a$ being connected to the pivot end $c$ of the ground-bar $d$, and the pivot $e$ upon the opposite end of the ground-bar entering a shouldered socket $f$ on the end of the plow-point E.

With the single exception of the plow-point, the several parts of the plow are of common construction, and we therefore lay no claim thereto, and consequently they may be modified or changed, as found desirable, without departing from the principle of the invention, as the plow-point embodying our invention may be applied to any side-hill plow of whatever construction.

The plow-point E, unlike other points, is formed with the shouldered socket F to receive the pivot end $e$ of the ground-bar $d$, and has the flanged extension G for connecting thereto the frog D in the usual manner, the flanges of the extension being shown at *f*, and against which the edges of the frog abut. The frog D is connected to the point E and to the wing or mold-board C by riveting or in any other well-known and convenient manner.

The advantages of having the shouldered socket on the plow-point instead of the frog or wing has been fully described herein and further reference thereto is considered unnecessary.

Having now fully described our invention, what we claim as new, and desire to secure by Letters Patent, is—

1. In a side-hill plow, the combination of the wing or mold-board, the frog, and the point formed separate and afterward connected together, said point having a shouldered socket to receive the pivot end of the ground-bar, substantially as and for the purpose specified.

2. As an improved article of manufacture, a plow-point independent of the frog or mold-board and having a shouldered socket to receive the pivot end of the ground-bar and an extension adapted for attaching the frog thereto, substantially as and for the purpose set forth.

In testimony that we claim the above we have hereunto subscribed our names in the presence of two witnesses.

DANIEL BREVARD VANCE.
HENRY JEFFERSON LAURENCE.

Witnesses:
J. W. BREVARD,
W. R. McGINN.